(12) United States Patent
Chang (10) Patent No.: US 8,344,578 B1
(45) Date of Patent: Jan. 1, 2013

(54) MOTOR ROTOR

(75) Inventor: Chin-Feng Chang, Taichung (TW)

(73) Assignee: Chin-Feng Chang, Taichung (TW)

( * ) Notice: Subject to any disclaimer, the term of this patent is extended or adjusted under 35 U.S.C. 154(b) by 66 days.

(21) Appl. No.: 13/175,353

(22) Filed: Jul. 1, 2011

(51) Int. Cl.
*H02K 21/12* (2006.01)
*H02K 21/24* (2006.01)

(52) U.S. Cl. ........................................ 310/211; 310/212

(58) Field of Classification Search ................... 310/211, 310/212, 168–172
See application file for complete search history.

(56) References Cited

U.S. PATENT DOCUMENTS

2008/0290752 A1* 11/2008 Yamamoto et al. ...... 310/156.36

* cited by examiner

*Primary Examiner* — Timothy Thompson
*Assistant Examiner* — Tony M Joseph
(74) *Attorney, Agent, or Firm* — Apex Jurus, pllc; Tracy M. Heims (57) ABSTRACT

A motor rotor has an outer casing, multiple silicon-steel sheets, multiple copper sheets and multiple copper bars. The silicon-steel sheets are stacked and mounted in the outer casing and each has multiple through holes formed through the silicon-steel sheet at intervals. The copper sheets are mounted in the through holes, extend out of the silicon-steel sheets and each has two side faces. Each side face of the copper sheet has a flat inner end and an outer end. The flat inner end of the side face of the copper sheet is flat to enable a distance between the outer ends of two adjacent copper sheets to be smaller than a distance between the flat inner ends of the adjacent copper sheets. The copper bars are inserted into the copper sheets from the flat inner ends to the outer ends of the side faces of the copper sheets.

2 Claims, 10 Drawing Sheets

MOTOR ROTOR

BACKGROUND OF THE INVENTION

1. Field of the Invention

The present invention relates to a motor rotor, and more particularly relates to a motor rotor that can be manufactured easily and can reduce the cost of production.

2. Description of Related Art

Figure 6:
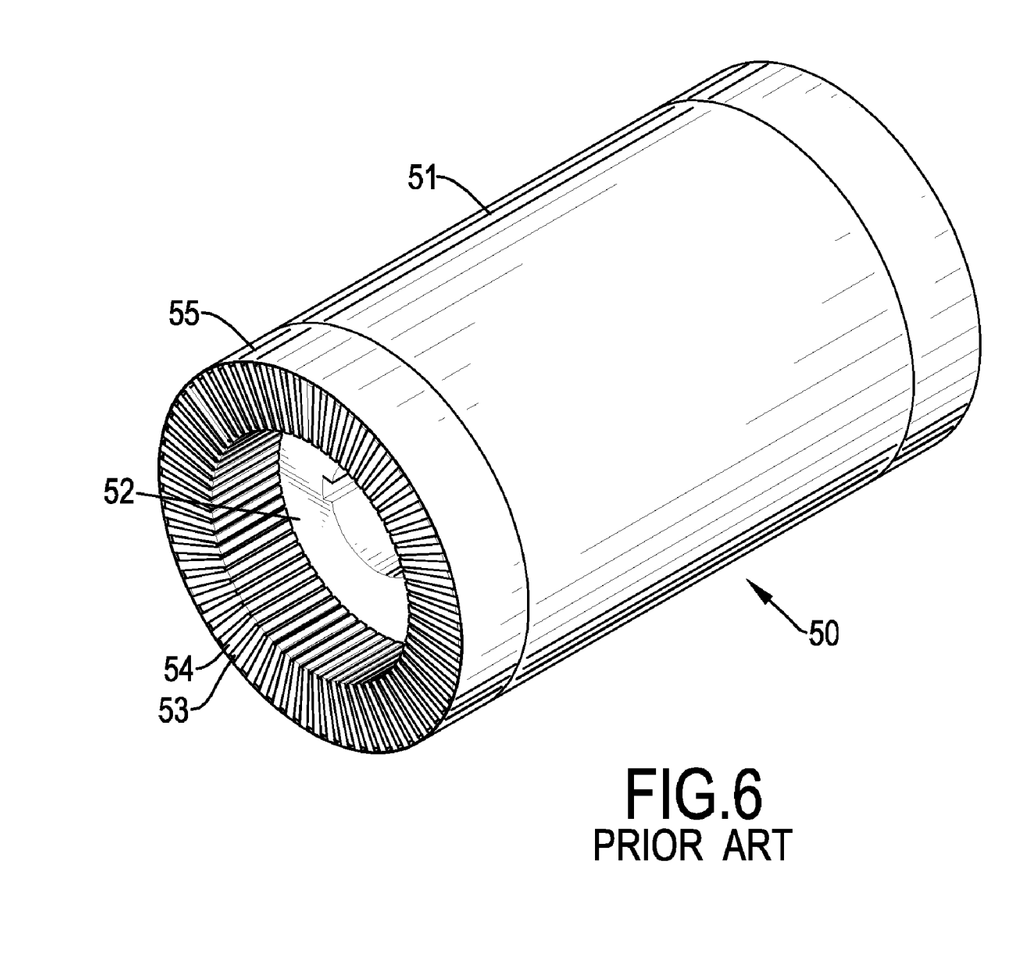
FIG. 6 is a perspective view of a motor rotor in accordance with the prior art.

With reference to FIG. 6, a conventional motor rotor 50 has an outer casing 51, multiple silicon-steel sheets 52, multiple copper sheets 53, multiple copper bars 54 and two holding rings 55. The silicon-steel sheets 52 are stacked and mounted in the outer casing 51 and each silicon-steel sheet 52 has a center and multiple through holes formed through the corresponding silicon-steel sheet 52 at intervals around the center of the corresponding silicon-steel sheet 52. The copper sheets 53 are mounted in the through holes of the silicon-steel sheets 52, extend out of the silicon-steel sheets 52 and each copper sheet 53 has two free ends extending out of the silicon-steel sheets 52 and two side face.

Figure 7:
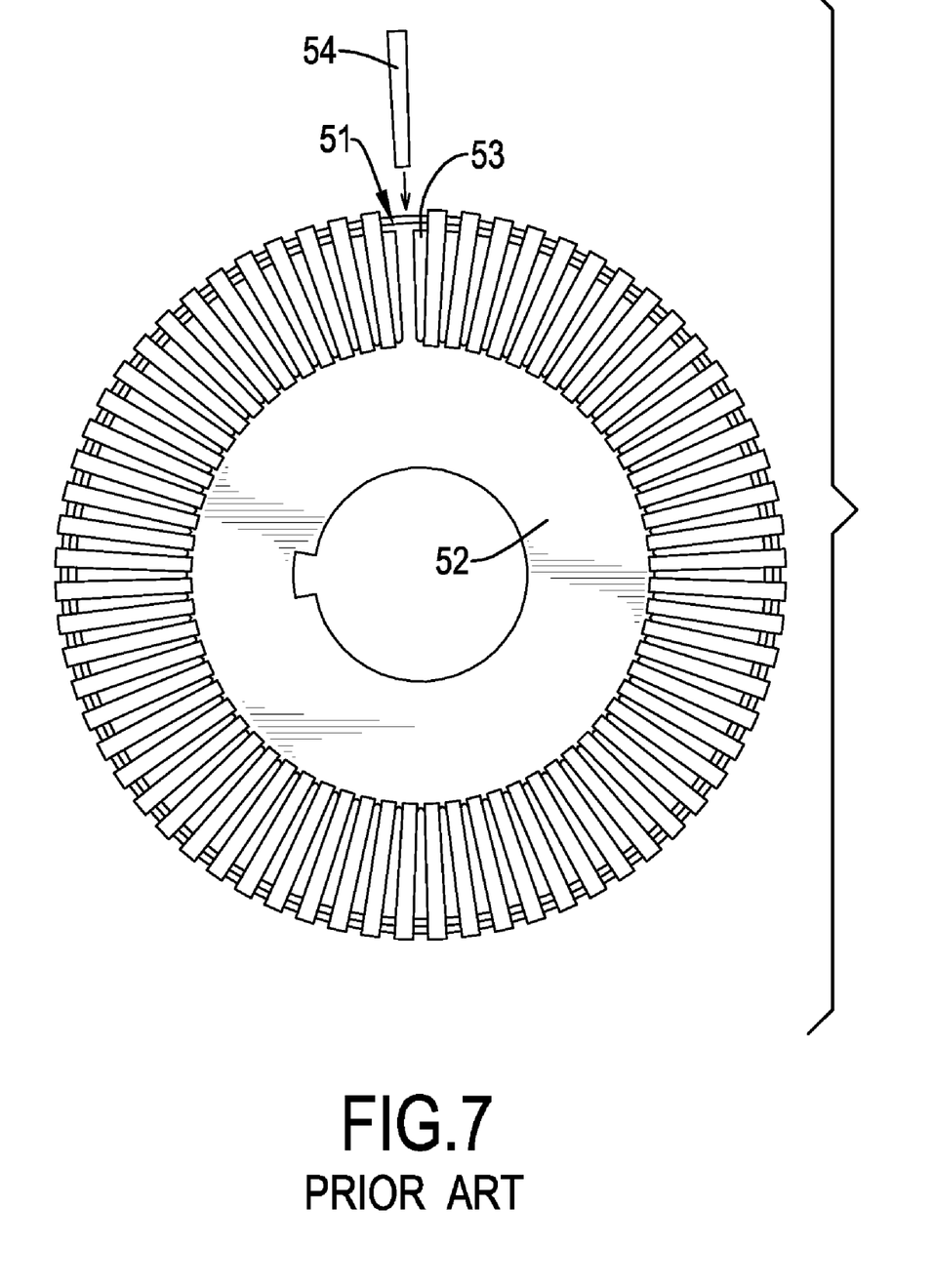
FIG. 7 is an operational side view of inserting a copper bar into two adjacent copper sheets of the motor rotor in FIG. 6.
Figure 8:
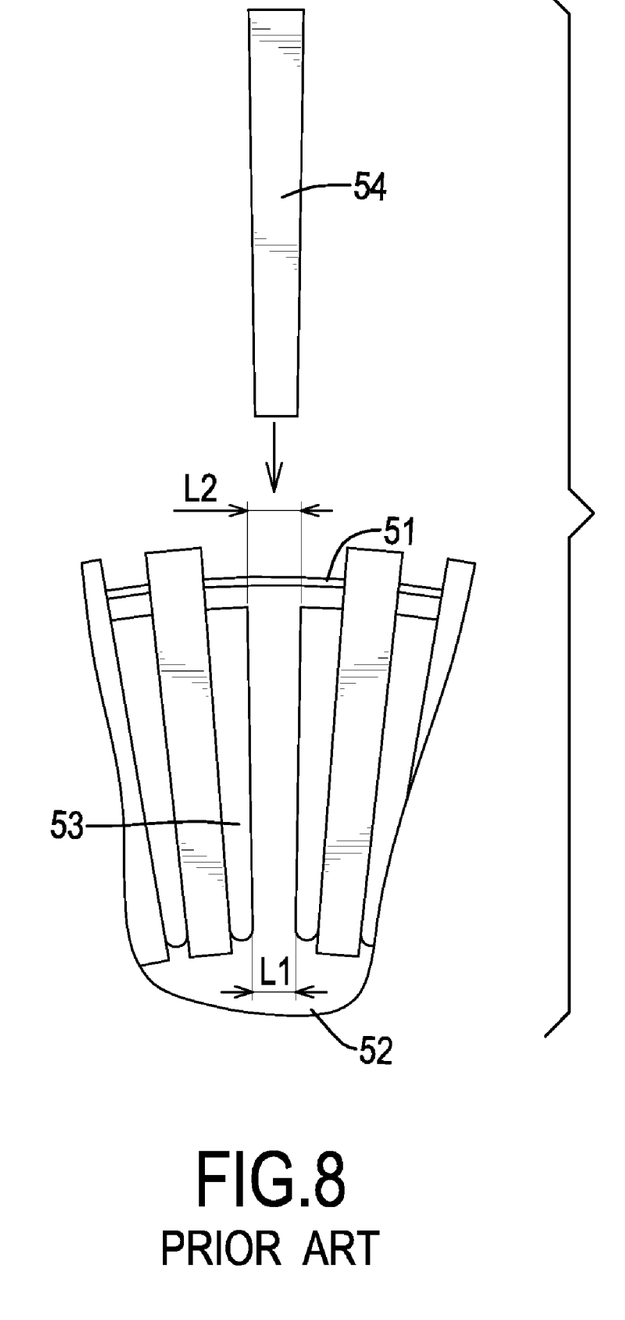
FIG. 8 is an enlarged side view of the copper bar inserted into the adjacent copper sheets of the motor rotor in FIG. 7.
Figure 9:
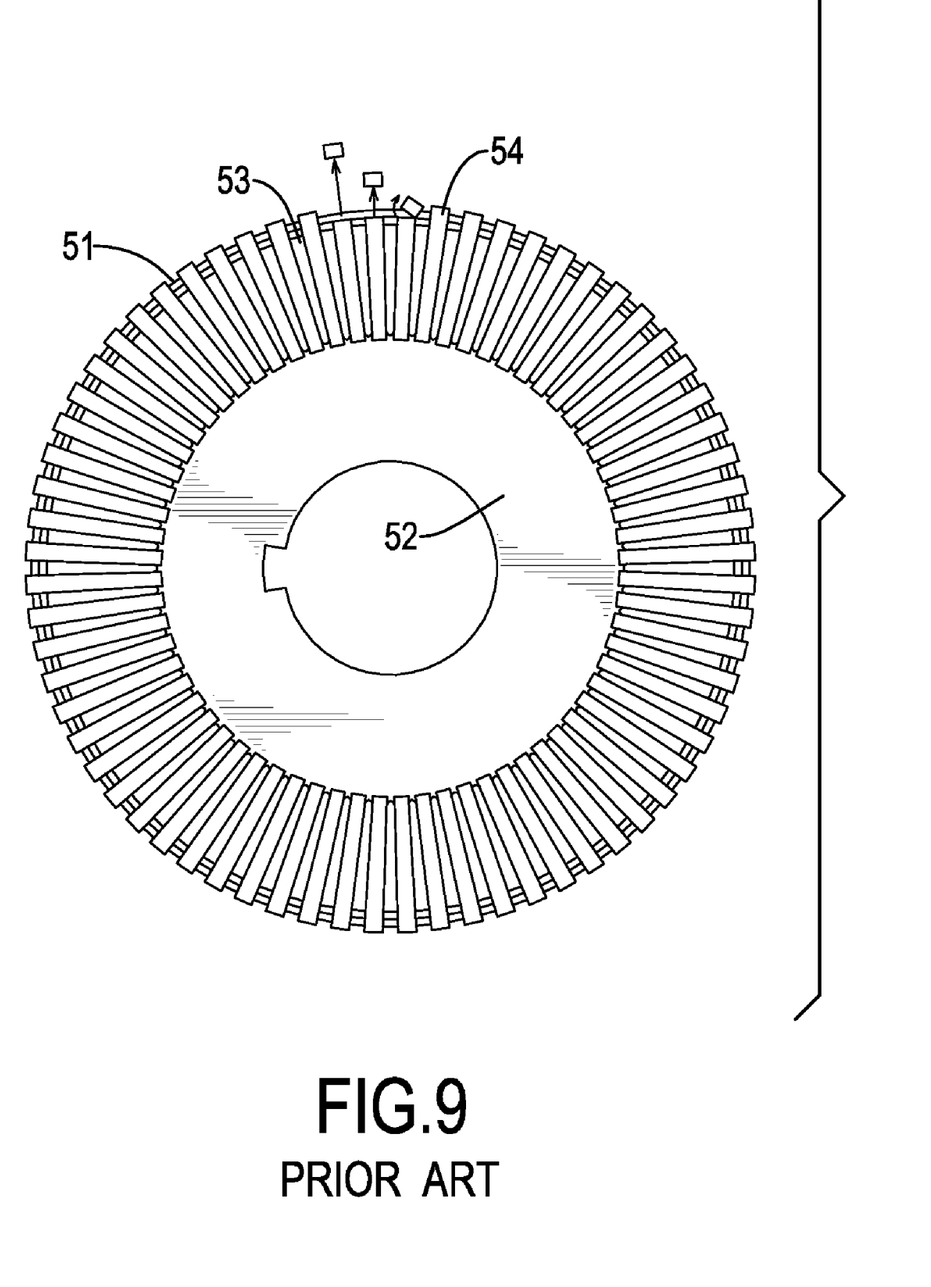
FIG. 9 is another operational side view of cutting the copper bars of the motor rotor in FIG. 7.
Figure 10:
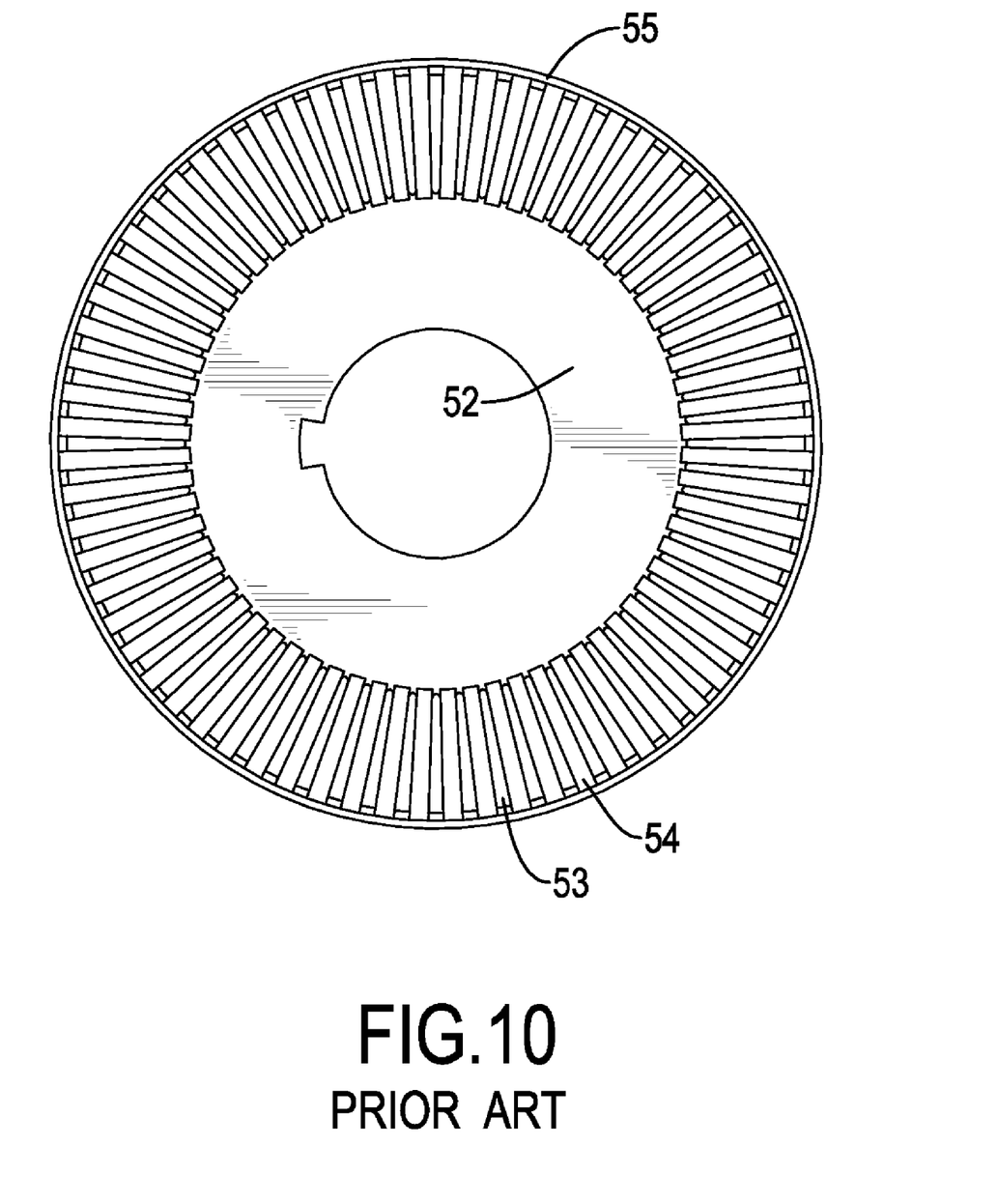
FIG. 10 is a side view of the motor rotor in FIG. 6.

With reference to FIGS. 7 and 8, each side face of each one of the copper sheets 53 has a curved inner end and an outer end. The distance between the center of the silicon-steel sheet 52 and the curved inner end of the copper sheet 53 is smaller than the distance between the center of the silicon-steel sheet 52 and the curved inner end of the copper sheet 53. The area of the side face is convergent from the outer end to the curved inner end of the side face of the copper sheet 53. Then, the distance (L2) between the outer ends of two adjacent copper sheets 53 is larger than the distance (L1) between the curved inner ends of the adjacent copper sheets 53. Therefore, the copper bars 54 are inserted into the copper sheets 53 from the outer ends to the curved inner ends of the side faces of the copper sheets 53. With reference to FIGS. 9 and 10, after the copper bars 54 are mounted with the copper sheets 53, heating and sintering the copper sheets 53 and copper bars 54, cutting the superfluous sections of the copper bars 54 that go beyond an inner diameter of the outer casing 51 and respectively mounting the holding rings 55 around the copper sheets 53 and the copper bars 54 at the free ends of the copper sheets 53. Then, the conventional motor rotor 50 can be manufactured as shown in FIG. 6.

The conventional motor rotor 50 can be manufactured by the above-mentioned method. However, when manufacturing the conventional motor rotor, the copper bars 54 are needed to insert into the copper sheets 53 from the outer ends to the curved inner ends of the side faces of the copper sheets 53 due to the distance (L2) between the outer ends of two adjacent copper sheets 53 is larger than the distance (L1) between the curved inner ends of the adjacent copper sheets 53. Furthermore, the superfluous sections of the copper bars 54 that go beyond an inner diameter of the outer casing 51 are needed to cut and the holding rings 55 are needed to mount around the copper sheets 53 and the copper bars 54 to prevent the copper bars 54 from separating from the copper sheets 53 by a centrifugal force when the conventional motor rotor 50 is rotated. Therefore, the feature and the structure relationship of the distance (L2) between the outer ends of two adjacent copper sheets 53 is larger than the distance (L1) between the curved inner ends of the adjacent copper sheets 53 of the conventional motor rotor 50 will increase the complication and the cost of production.

Therefore, the present invention provides a motor rotor to mitigate or obviate the aforementioned problems.

SUMMARY OF THE INVENTION

The main objective of the present invention is to provide a motor rotor that can be manufactured easily and can reduce the cost of production.

The motor rotor in accordance with the present invention has an outer casing, multiple silicon-steel sheets, multiple copper sheets and multiple copper bars. The silicon-steel sheets are stacked and mounted in the outer casing and each has a center and multiple through holes formed through the silicon-steel sheet at intervals around the center of the silicon-steel sheet. The copper sheets are mounted in the through holes of the silicon-steel sheets, extend out of the silicon-steel sheets and each has two free ends and two side faces. Each side face of the copper sheet has a flat inner end and an outer end. The flat inner end of the side face of the copper sheet is flat to enable a distance between the outer ends of two adjacent copper sheets to be smaller than a distance between the flat inner ends of the adjacent copper sheets. The copper bars are inserted into the copper sheets from the flat inner ends to the outer ends of the side faces of the copper sheets without extending out of the outer ends of the side faces of the copper sheets.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, a first embodiment of a motor rotor in accordance with the present invention comprises an outer casing 10, multiple silicon-steel sheets 20, multiple copper sheets 30 and multiple copper bars 40.

The outer casing 10 is hollow and has two open ends. The silicon-steel sheets 20 are stacked and mounted in the outer casing 10 between the open ends of the outer casing 10 and each silicon-steel sheet 20 has a center and multiple through holes 21. The through holes 21 are formed through the silicon-steel sheet 20 at intervals around the center of the silicon-steel sheet 20.

The copper sheets 30 are mounted in the through holes 21 of the silicon-steel sheets 20, extend out of the silicon-steel sheets 20 and the open ends of the outer casing 10 and each copper sheet 30 has two free ends and two side faces. The free ends of the copper sheets 30 extend out of the silicon-steel sheets 20 and the open ends of the outer casing 10. Each side face of the copper sheet 30 has a flat inner end 31 and an outer end 32. The distance between the center of the silicon-steel sheet 20 and the flat inner end of the copper sheet 30 is smaller than the distance between the center of the silicon-steel sheet 20 and the corresponding outer end of the copper sheet 30. The flat inner end 31 of the side face of the copper sheet 30 can enable the distance (L2) between the outer ends 32 of two adjacent copper sheets 30 to be smaller than the distance (L1) between the flat inner ends 31 of the adjacent copper sheets 30.

The copper bars 40 are inserted into the copper sheets 30 from the flat inner ends 31 to the outer ends 32 of the side faces of the copper sheets 30 without extending out of the outer ends 32 of the side faces of the copper sheets 30.

Figure 1:
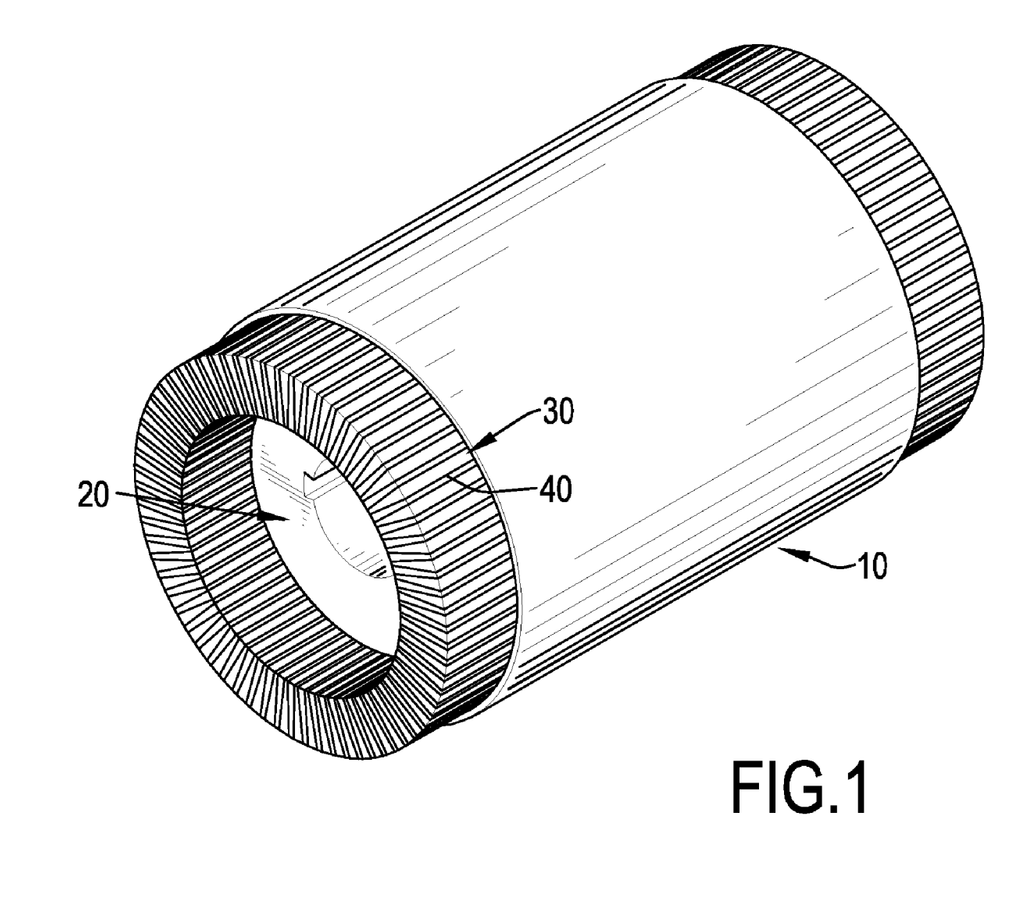
FIG. 1 is a perspective view of a first embodiment of a motor rotor in accordance with the present invention.
Figure 2:
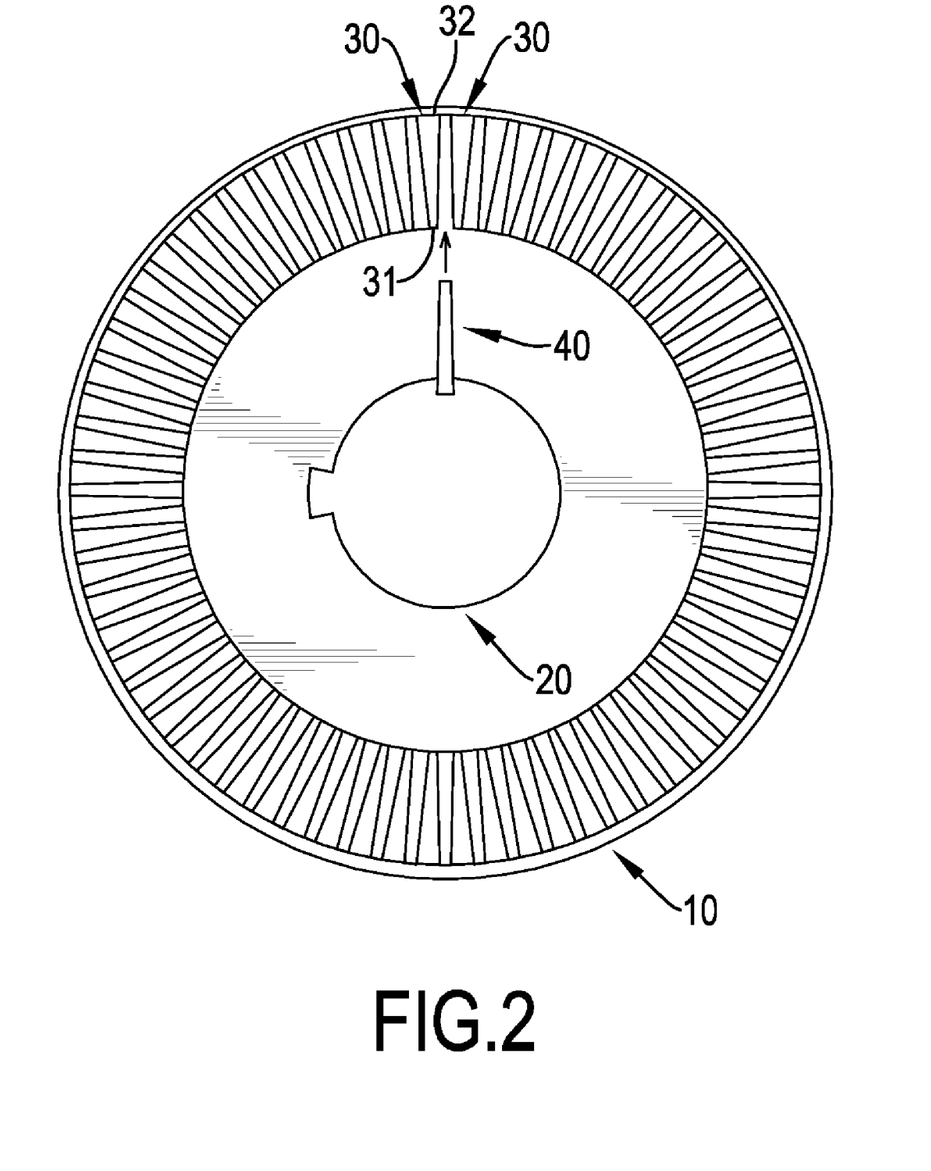
FIG. 2 is an operational side view of inserting a copper bar into two adjacent copper sheets of the motor rotor in FIG. 1.
Figure 3:
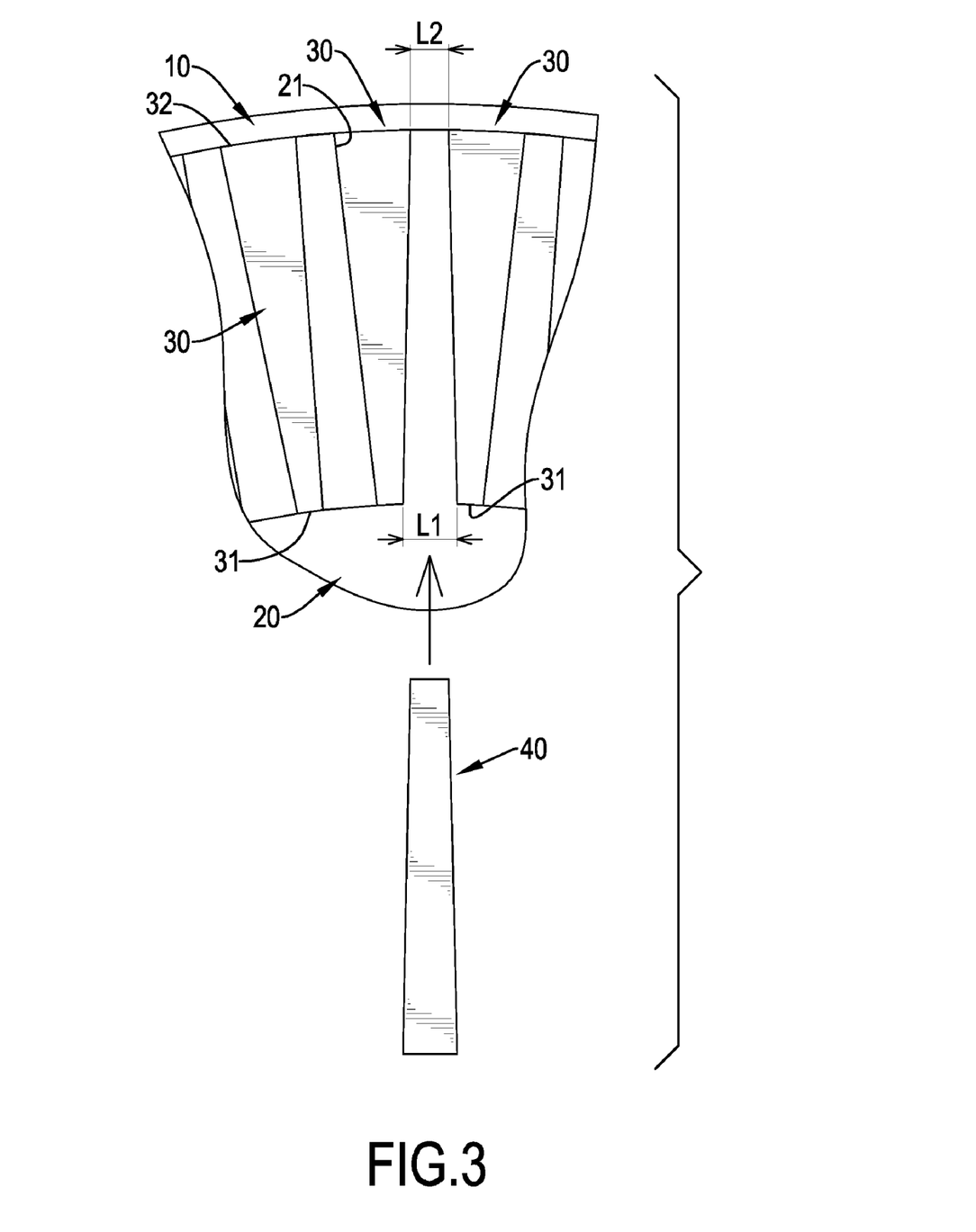
FIG. 3 is an enlarged side view of the copper bar inserted into the adjacent copper sheets of the motor rotor in FIG. 2.
Figure 4:
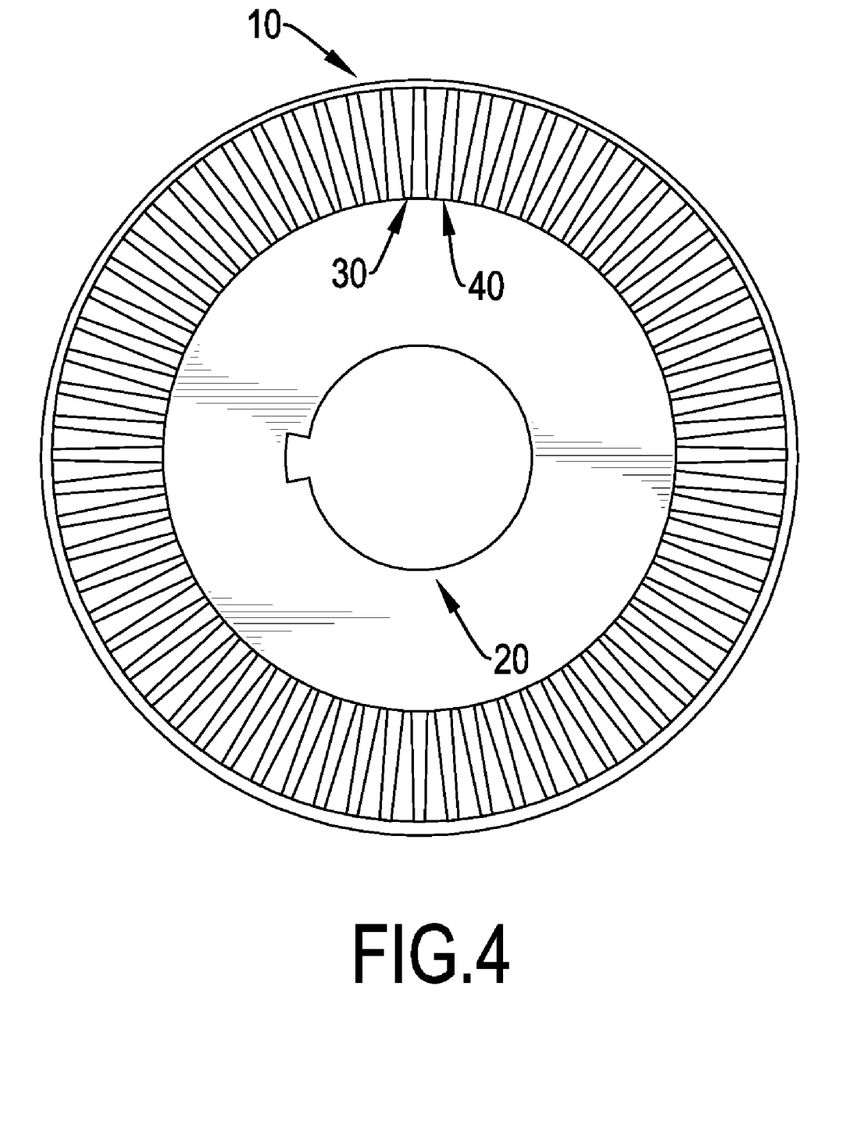
FIG. 4 is a side view of the motor rotor in FIG. 1.
Figure 5:
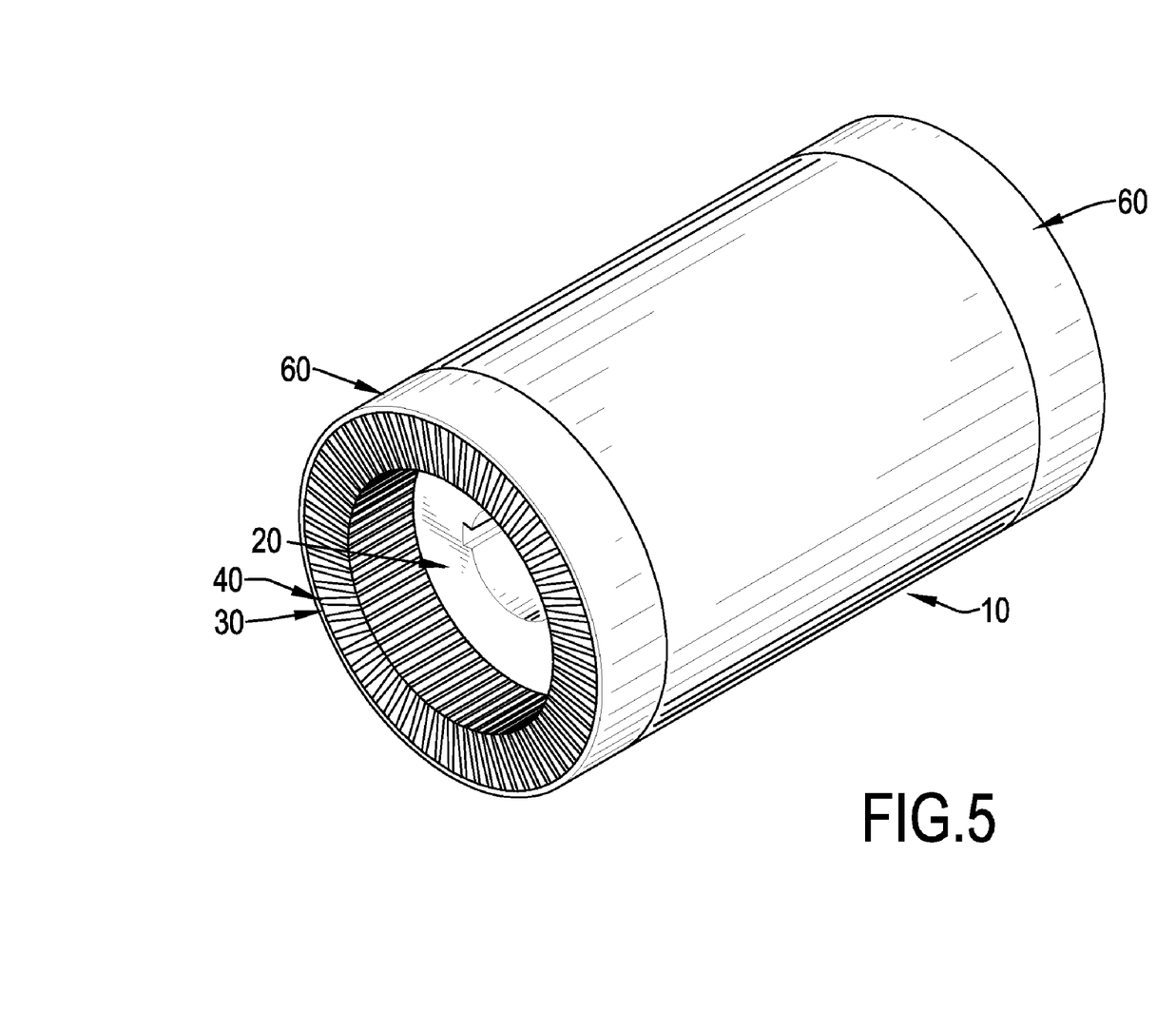
FIG. 5 is a perspective view of a second embodiment of a motor rotor in accordance with the present invention.

With reference to FIG. 5, the second embodiment of a motor rotor in accordance with the present invention has a structure substantially the same as that in the first embodiment except that the second embodiment of the motor rotor further has two holding rings 60 respectively mounted around the copper sheets 30 and the copper bars 40 at the free ends of the copper sheets 30.

According to the above-mentioned, the copper bars 40 of the motor rotor in accordance with the present invention can be inserted into and mounted between the copper sheets 30 from the flat inner ends 31 to the outer ends 32 of the side faces of the copper sheets 30 due to the distance (L2) between the outer ends 32 of two adjacent copper sheets 30 is smaller than the distance (L1) between the flat inner ends 31 of the adjacent copper sheets 30. In addition, the copper bars 40 are not extend out of the outer ends 32 of the side faces of the copper sheets 30 and this will not need to cut the copper bars 40 after inserting the copper bars 40 into the copper sheets 30 and this can reduce the complication and the cost of production.

Furthermore, the copper bars 40 of the motor rotor of the present invention can be held securely between the copper sheets 30 by the distance (L2) between the outer ends 32 of two adjacent copper sheets 30 is smaller than the distance (L1) between the flat inner ends 31 of the adjacent copper sheets 30 and this feature and structure relationship can be used to resist a centrifugal force when the motor rotor 50 is rotated without using the holding rings 55 and this also can simplify the manufacturing process and reduce the cost of production.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A motor rotor comprising:
an outer casing being hollow and having two open ends;
multiple silicon-steel sheets stacked and mounted in the outer casing between the open ends of the outer casing and each silicon-steel sheet having
a center; and
multiple through holes formed through the silicon-steel sheet at intervals around the center of the silicon-steel sheet;
multiple copper sheets mounted in the through holes of the silicon-steel sheets, extending out of the silicon-steel sheets and the open ends of the outer casing and each copper sheet having
two free ends extending out of the silicon-steel sheets and the open ends of the outer casing; and
two side faces and each side face of the copper sheet having
an outer end; and
a flat inner end being flat and having a distance to the center of the silicon-steel sheet being smaller than that between the center of the silicon-steel sheet and the outer end to enable a distance between the outer ends of two adjacent copper sheets to be smaller than a distance between the flat inner ends of the adjacent copper sheets; and
multiple copper bars inserted into the copper sheets from the flat inner ends to the outer ends of the side faces of the copper sheets without extending out of the outer ends of the side faces of the copper sheets.

2. The motor rotor as claimed in claim 1, wherein the motor rotor has two holding rings respectively mounted around the copper sheets and the copper bars at the free ends of the copper sheets.

\* \* \* \* \*